United States Patent
Nevo et al.

(10) Patent No.: US 6,813,256 B1
(45) Date of Patent: Nov. 2, 2004

(54) SIGNALING DATA LINK FOR A GSM-CDMA AIR INTERFACE

(75) Inventors: Ron Nevo, Hillsboro, OR (US); Michael Vakulenko, Haifa (IL); Sergio Kolor, Haifa (IL); Shlomo Nizri, Kibbutz Hasolelim (IL); Atai Levy, Haifa (IL)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/409,928

(22) Filed: Sep. 30, 1999

(51) Int. Cl.[7] .............................................. H04B 7/216
(52) U.S. Cl. ........................ 370/335; 370/337; 370/467
(58) Field of Search ................................ 370/328, 329, 370/330, 335, 336, 337, 342, 347, 349, 441, 442, 465, 467, 469, 466, 338

(56) References Cited

U.S. PATENT DOCUMENTS

| | | | | |
|---|---|---|---|---|
| 5,640,386 A | * | 6/1997 | Wiedeman | 370/230 |
| 5,664,004 A | * | 9/1997 | Durchman et al. | 370/469 |
| 5,878,036 A | | 3/1999 | Spartz et al. | 370/335 |
| 5,920,553 A | * | 7/1999 | Keskitalo et al. | 370/335 |
| 5,920,822 A | * | 7/1999 | Houde et al. | 370/349 |
| 6,160,992 A | * | 12/2000 | Laham et al. | 455/11.1 |
| 6,320,873 B1 | * | 11/2001 | Nevo et al. | 370/335 |

FOREIGN PATENT DOCUMENTS

WO      0013440      3/2000      ............ H04Q/7/30

OTHER PUBLICATIONS

Tscha, et al., "A Subscriber Signalling Gateway between CDMA Mobile Station and GSM Mobile Switching Center", International Conference on Universal Personal Communications, IEEE, Oct. 1993, vol. 1, pp. 181–185.

* cited by examiner

Primary Examiner—Chau Nguyen
Assistant Examiner—Soon-Dong Hyun
(74) Attorney, Agent, or Firm—Albert J. Harnois, Jr.; Sandip (Micky) Minhas; Philip Wadsworth

(57) ABSTRACT

In a GSM mobile wireless telecommunications system, a method for conveying signaling between a mobile station and a base station via a CDMA air interface includes generating a signaling message based on a GSM interface standard. Data link services are provided to process the message for transmission over the CDMA air interface, and the processed message is then transmitted over the CDMA air interface. Preferably, the data link services are provided by a data link layer, which produces an IS-95 message for transmission.

10 Claims, 8 Drawing Sheets

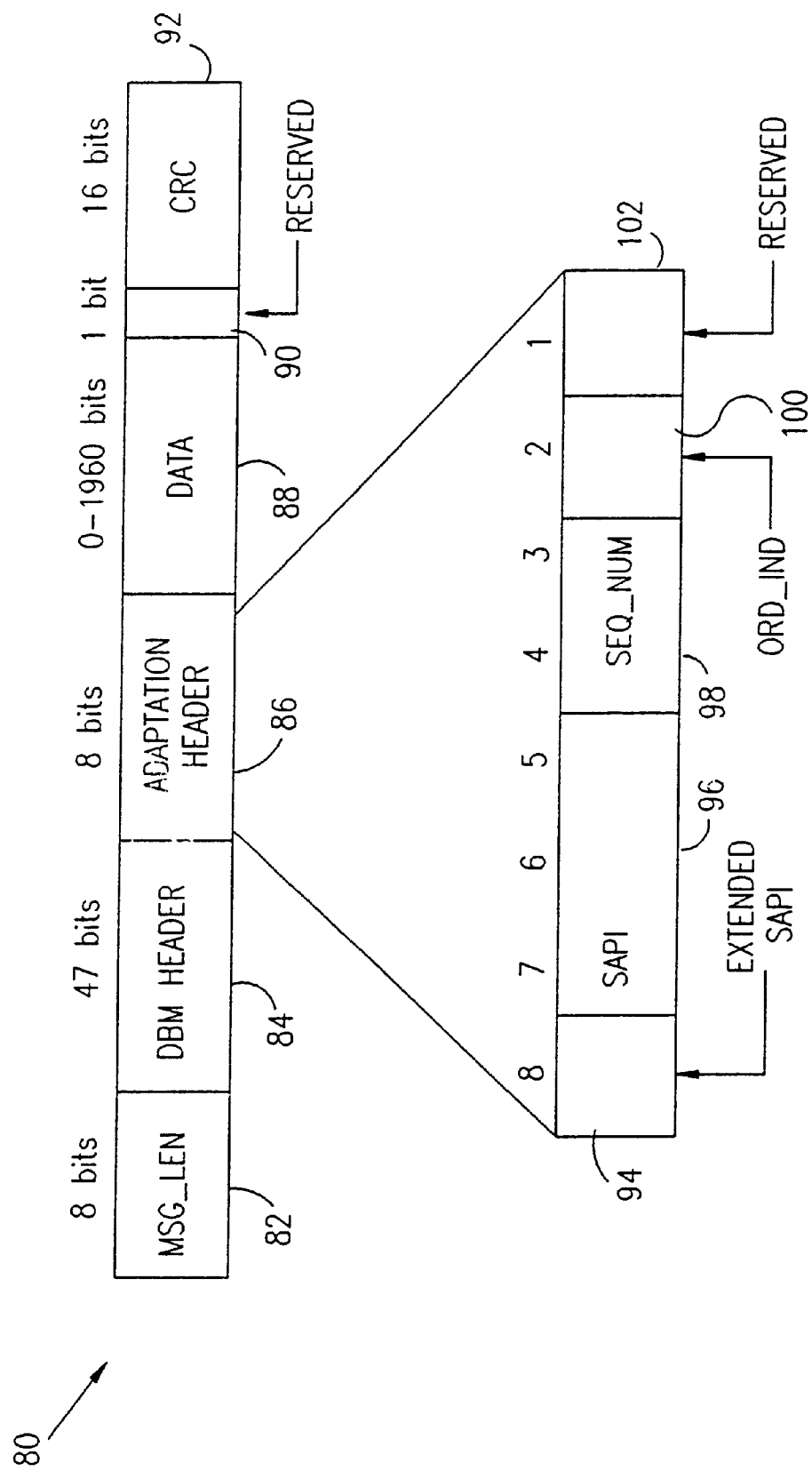

SIGNALING DATA LINK FOR A GSM-CDMA AIR INTERFACE

FIELD OF THE INVENTION

The present invention relates generally to wireless telecommunications, and specifically to advanced cellular telephone networks.

BACKGROUND OF THE INVENTION

The Global System for Mobile (GSM) telecommunications is used in cellular telephone networks in many countries around the world. GSM offers a useful range of network services and standards. GSM standards define protocol stacks that are used in conveying signaling and user traffic between elements of the network, including subscriber units (also known as mobile stations—MSs), base station subsystems (BSSs) and mobile switching centers (MSCs).

FIG. 1 is a block diagram schematically illustrating the GSM standard protocol stack used in signaling over dedicated control channels between an MS and the network, as is known in the art and defined by GSM standards, particularly the GSM 04.xx series of standards. The term "dedicated" refers to communication channels used during a call to or from the MS, as opposed to when the MS is in an idle, or standby, state. The lowest protocol layer is the physical layer of the air interface, which in existing GSM networks is based on time-division multiple access (TDMA) digital communications technology. The data link layer provides data link services and functionality, as defined in particular in GSM standards 04.05 and 04.06, which are incorporated herein by reference. The GSM data link layer supports both acknowledged and unacknowledged messaging operation modes. In the acknowledged mode, the data link layer provides reliable transmission of upper layer messages, with services including: (1) message ordering, (2) priority and fragmentation, and (3) suspension and resumption of communications.

A radio interface layer, which in one embodiment includes three sublayers, controls and passes signals through the data link layer and physical layer. It will be understood by those skilled in the art that the terms Layer 1 and physical layer are commonly used interchangeably. Similarly, Layer 2 and the data link layer are commonly used interchangeably. Furthermore, the terms Layer 3, RIL3, and radio interface layer are commonly used interchangeably by those skilled in the art. In the present case, the terms physical layer, data link layer, and radio interface layer are used throughout, merely for the sake of clarity.

The lowest sublayer of the radio interface layer is a Radio Resource (RR) management sublayer. The RR management sublayer supports Mobility Management (MM) and Call Management (CM) sublayers above it. The CM sublayer supports signaling for call processing, as well as GSM supplementary services. The MM sublayer supports signaling required for locating the MS, authentication and encryption key management. It should be noted that any protocol that may be used to transmit messages through the physical layer and the data link layers, such as protocols associated with GSM short message service (SMS), would be considered to be a radio interface layer protocol for the purpose of this description.

Code-division multiple access (CDMA) is an improved digital communications technology, which affords more efficient use of radio bandwidth than TDMA, as well as a more reliable, fade-free link between cellular telephone subscribers and base stations. The leading CDMA standard is TIA/EIA-95 (commonly referred to as IS-95), promulgated by the Telecommunications Industry Association (TIA). IS-95 defines its own protocol stack for transmission of signaling over traffic channels, including a physical layer and a data link layer. Because the IS-95 CDMA air interface is based on fundamentally different technology from the GSM TDMA interface, there are substantial differences between the conventional IS-95 and GSM protocol stacks. Furthermore, the standard IS-95 data link layer does not provide some of the data link layer services defined by GSM standards for signaling over traffic channels, particularly services associated with acknowledged mode operation. For example, IS-95 data link layer does comply with GSM requirements for signaling on overhead (e.g., paging and access) channels.

International Patent Application Number PCT/US96/20764, which is incorporated herein by reference, describes a wireless telecommunications system that uses a CDMA air interface to implement GSM network services and protocols. Using this system, at least some of the TDMA base stations and subscriber units of an existing GSM network would be replaced or supplemented by corresponding CDMA equipment. CDMA BSSs (base station subsystems) in this system are adapted to communicate with GSM mobile switching centers (MSCs) via a standard GSM A-interface. Core GSM network services are thus maintained, and the changeover from TDMA to CDMA is transparent to users.

Hybrid cellular communications networks, incorporating both GSM and CDMA elements, are also described in International Publication Numbers WO 95/24771 and WO 96/21999, and in an article by Tscha, et al., entitled "A Subscriber Signaling Gateway between CDMA Mobile Station and GSM Mobile Switching Center," in Proceedings of the 2nd International Conference on Universal Personal Communications, Ottawa (1993), pp. 181–185, which are incorporated herein by reference.

SUMMARY OF THE INVENTION

It is an object of some aspects of the present invention to provide methods and apparatus for conveying signaling over dedicated channels of an air interface between mobile stations and base station subsystems in a hybrid Global System for Mobile (GSM)/Code Division Multiple Access (CDMA) cellular communications network.

It is a further object of some aspects of the present invention to provide communications protocols that enable the use of GSM-compatible signaling over dedicated channels of a CDMA air interface.

In preferred embodiments of the present invention, a mixed GSM/CDMA cellular communications system includes one or more CDMA base station subsystems (BSSs), controlled by a GSM mobile switching center (MSC). A mobile station (MS) and one of the BSSs communicate over a CDMA air interface (i.e., physical layer) using a protocol stack including a data link layer that is modified so as to support a GSM-CDMA radio interface layer that is based on a GSM radio interface layer. Preferably, at least the Radio Resource (RR) sublayer of the GSM radio interface layer is also modified so as to interact with the CDMA air interface (i.e., physical layer), as described further in a U.S. patent application Ser. No. 09/119,717, entitled "Base Station Handover in a Hybrid GSM/CDMA Network," filed Jul. 20, 1998, which is assigned to the assignee of the present patent application and is incorporated herein by reference. This modified RR is referred to as a GSM-CDMA RR.

The system thus enables the use of GSM signaling in dedicated traffic channels over the CDMA air interface. The modifications to the protocol stack provide functionality required to support substantially all of the GSM dedicated channel signaling services that are not provided by CDMA communications industry standards.

In some preferred embodiments of the present invention, the mixed GSM/CDMA cellular communications system includes both TDMA and CDMA base stations, jointly controlled by a mobile switching center (MSC). Systems of this type are described generally in the above-mentioned international applications and the above referenced U.S. patent application entitled "Base Station Handover in a Hybrid GSM/CDMA Network". The MS is capable of communicating with both types of base stations, by appropriately switching between TDMA and CDMA air interfaces, while preferably using GSM network and signaling protocols over both types of interface. This use of GSM protocols over the CDMA air interface is enabled by the modified data link layer and by suitable modification of the GSM-RR sublayer. The Mobility Management (MM) and Call Management (CM) sublayers are preferably substantially unmodified relative to GSM standards.

In some preferred embodiments of the present invention, the modified data link layer comprises two sublayers: a lower sublayer, substantially corresponding to IS-95 data link layer, as defined by the IS-95 specification, which communicates with the CDMA physical layer; and an upper sublayer, referred to herein as an adaptation sublayer, communicating between the lower sublayer and the RR sublayer of the GSM-CDMA radio interface layer. The adaptation sublayer provides additional functionality that is required by GSM standards relating to data link layer, but is not offered by the lower sublayer (i.e., by IS-95 data link layer). The additional functionality preferably includes: (1) procedures for provisioning several data links, each having different transmission properties; (2) identification of data link connection endpoints; (3) ordering of radio interface layer messages; (4) fragmentation and re-assembly of large radio interface layer messages; (5) transmission of radio interface layer messages according to their priority; (6) suspension and resumption of data link services during handover; and (7) transparent transmission of IS-95 signaling messages (tunneling).

There is therefore provided, in accordance with a preferred embodiment of the present invention, in a GSM mobile wireless telecommunications system, a method for conveying signaling between a mobile station and a base station via a CDMA air interface, including:

generating a signaling message based on a GSM interface standard;

providing data link services to process the message for transmission over the CDMA air interface; and transmitting the processed message over the CDMA air interface.

Preferably, providing the data link services includes producing an IS-95 message for transmission, using a data link layer to process the signaling message based on the GSM interface standard. The data link layer preferably includes an adaptation sublayer, which receives and, most preferably, encapsulates the signaling message to produce the IS-95 message based on the signaling message.

Additionally or alternatively, the inventive data link layer further includes an IS-95 data link layer, and the adaptation sublayer receives the signaling message from a radio resource protocol sublayer based on a GSM standard conveys the IS-95 message to the IS-95 data link layer. Preferably, the adaptation sublayer further receives a signaling message based on an IS-95 standard and conveys the message based on the IS-95 standard to the data link layer substantially without processing.

Preferably, providing the data link services includes encapsulating the message, most preferably in the general form of an IS-95 Data Burst Message.

In a preferred embodiment, providing the data link services includes fragmenting the message into a plurality of sub-messages for transmission over the CDMA air interface. Preferably, fragmenting the message includes assigning a message number in a header of each of the sub-messages according to a sequential order thereof, and the method includes receiving the sub-messages and concatenating them in the sequential order responsive to the message number.

Preferably, generating the message includes generating a plurality of messages having an assigned order, and the method includes receiving the messages in an acknowledged operation mode over the CDMA air interface and arranging the messages responsive to the assigned order.

Further preferably, generating the message includes generating a plurality of messages having respective priorities, and providing the data link services includes conveying the processed messages for transmission over the CDMA air interface in an order responsive to the priorities thereof, wherein providing the data link services preferably includes assigning a priority responsive to a GSM service access point indicator.

Preferably, providing the data link services includes suspending transmission of messages by the mobile station during a hard handover of the mobile station from a first base station to a second base station and resuming the transmission after the handover is complete. In a preferred embodiment, the first base station has a CDMA air interface, and the second base station has a GSM-TDMA air interface, and providing the data link services includes transferring the messages whose transmission is suspended responsive to the hard handover to a GSM data link layer, so that the message is prepared for transmission over the GSM-TDMA air interface.

Preferably, transmitting the processed message includes transmitting a message over a traffic channel.

There is further provided, in accordance with a preferred embodiment of the present invention, wireless communications apparatus, for use in a GSM mobile telecommunications system, including a base station and a mobile station, which communicate over a CDMA air interface and provide data link services for processing of messages to be transmitted over the CDMA air interface, such that signaling messages between the base station and the mobile station, which are generated in accordance with a GSM interface standard, are processed for transmission using the data link services, whereby the signaling messages are transmitted over the CDMA air interface.

Preferably, the CDMA air interface is based on an IS-95 standard, wherein the base station and mobile station communicate using a protocol stack including a data link layer to process the signaling messages based on the GSM interface standard. The data link layer preferably includes an adaptation sublayer that receives and, most preferably, encapsulates the signaling message and produces the IS-95 message based on the signaling message.

In a preferred embodiment, the data link layer further includes an IS-95 data link layer, and the adaptation sublayer receives the signaling message from a radio resource protocol sublayer based on a GSM standard and conveys the IS-95 message to the IS-95 data link layer. Preferably, the adaptation sublayer further receives a signaling message based on an IS-95 standard and conveys the message based on the IS-95 standard to the data link layer substantially without processing. Further preferably, the signaling messages are encapsulated for transmission, most preferably in the general form of IS-95 Data Burst Messages.

Preferably, at least some of the messages are fragmented into a plurality of sub-messages for transmission over the CDMA air interface, wherein a message number is assigned in a header of each of the sub-messages according to a sequential order thereof, and when the sub-messages are received, they are concatenated in the sequential order responsive to the message number.

In a preferred embodiment, a plurality of messages are transmitted according to an assigned order in an acknowledged transmission mode over the CDMA air interface, and when the messages are received, they are arranged for output responsive to the assigned order.

Preferably, the messages have respective priorities and are conveyed for transmission over the CDMA air interface in an order responsive to the priorities thereof, wherein the priorities are assigned responsive to a GSM service access point indicator.

Preferably, the mobile station suspends transmission of the messages during hard handover of the mobile station from a first base station to a second base station and resumes transmission after the handover is complete. In a preferred embodiment, the first base station has a CDMA air interface, and the second base station has a GSM-TDMA air interface, wherein suspended messages are transferred responsive to the handover to a GSM data link layer, so that the message is prepared for transmission over the GSM-TDMA air interface. Preferably, the processed message is transmitted over a traffic channel.

The present invention will be more fully understood from the following detailed description of the preferred embodiments thereof, taken together with the drawings in which:

BRIEF DESCRIPTION OF THE DRAWINGS

FIG. 4 is a schematic block diagram illustrating a message conveyed between elements of the system of FIG. 2, in accordance with a preferred embodiment of the present invention;

DETAILED DESCRIPTION OF PREFERRED EMBODIMENTS

Figure 2:
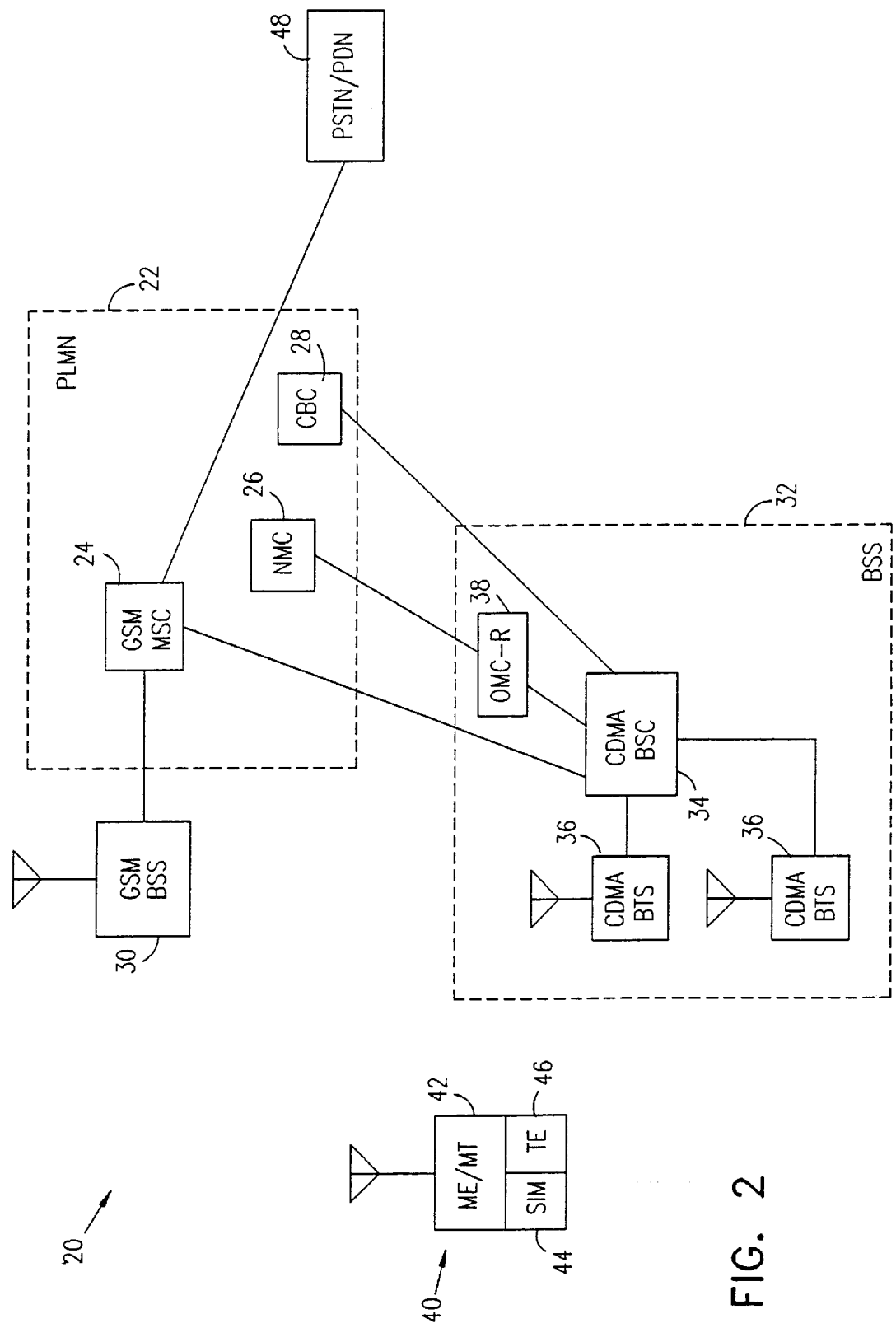
FIG. 2 is a schematic block diagram of a hybrid GSM/CDMA cellular communications system, in accordance with a preferred embodiment of the present invention.

Reference is now made to FIG. 2, which is a schematic block diagram of a hybrid GSM/CDMA cellular communications system 20, in accordance with a preferred embodiment of the present invention. System 20 is built around a public land mobile network (PLMN) 22, which is based on GSM communications standards, as described hereinabove. Infrastructure for such networks already exists and is in wide use in many countries, and the present invention has the advantage of enabling gradual introduction of CDMA service in conjunction with such a network without requiring major changes to the existing infrastructure.

PLMN 22 comprises at least one mobile-services switching center (MSC) 24, or possibly a number of such centers (although only one MSC is shown here for clarity of illustration), which controls network operations within a geographical area. Among other functions, MSC 24 is responsible for location registration of subscriber units and handover of subscriber units between base stations, as well as linking PLMN 22 to a public switched telephone network (PSTN) and/or packet data network (PDN) 48. The PLMN also comprises a network management center (NMC) 26 and a cell broadcast center (CBC) 28. The functions of these elements, as well as other aspects of system 20 and details regarding construction and operation of a mobile station (MS) 40 in the system, are described further in the above-mentioned U.S. patent application entitled "Base Station Handover in a Hybrid GSM/CDMA Network," and the above referenced international patent applications.

System 20 includes a plurality of MSs 40, which communicate with PLMN 22 via a plurality of base station subsystems (BSS) 30 and 32 over a wireless RF link in one or more of the accepted cellular communications frequency bands. MS 40, which is also known as a subscriber unit, is preferably capable of communicating with both GSM BSS 30, using a substantially standard GSM TDMA signaling protocol, and CDMA BSS 32, using CDMA-based communication methods described hereinbelow. Although for the sake of clarity, only one each of MS 40, GSM BSS 30 and CDMA BSS 32 is shown in FIG. 2, it will be understood that in actuality, system 20 typically comprises a plurality of each of these system elements.

Both GSM BSS 30 and CDMA BSS 32 communicate with and are controlled by MSC 24. Communications between GSM BSS 30 and MSC 24 are substantially in accordance with GSM standards. CDMA BSS 32 is modified relative to the IS-95 CDMA standard so as to communicate with PLMN 22 in accordance with GSM standards, and in particular so as to communicate with MSC 24 via the GSM standard A-interface, as described further hereinbelow with reference to FIG. 3A. Preferably, BSS 32 also communicates with CBC 28, so as to receive messages to be broadcast over the air, and comprises a radio operation and maintenance center (OMC-R) 38, which communicates with NMC 26.

Communications between CDMA BSS 32 and MS 40 are built on a CDMA air interface, which is preferably generally in accordance with the IS-95 standard for CDMA communications, and most preferably the IS-95B (TIA/EIA-95-B) version of the standard. BSS 32 is built around a base station controller (BSC) 34, which controls and communicates with a number of base station transceivers (BTS) 36. Each BTS transmits RF signals to and receives RF signals from MS 40 when the MS is within a geographical area, or cell, served by the particular BTS. When, during a telephone call, the MS moves from a cell of one CDMA BTS 36 to a cell of another CDMA BTS 36, a "soft handover" (or handoff) between the BTSs takes place, as is known in the CDMA art.

There may also be regions of service of system 20, however, which do not have CDMA coverage (i.e., there is no CDMA BTS 36 in such a region), or in which coverage is weak or congested. If MS 40 moves into such a region during a telephone call, the MS is handed over from the CDMA BTS to a BTS associated with GSM BSS 30 without interrupting the call. Similarly, if MS 40 moves from a region served only by GSM BSS 30 into the cell of CDMA BTS 36 during a call, the MS 40 is preferably handed over from the GSM to the CDMA BSS. Methods for performing such handovers between CDMA and GSM/TDMA service and vice versa, as well as between one CMDA BSS 32 and another, are described further in the above-mentioned US patent application entitled "Base Station Handover in a Hybrid GSM/CDMA Network."

By virtue of such methods and of the architecture of system 20, as shown in FIG. 2, MS 40 receives the benefits of CDMA service in those regions served by system 20 in which CDMA service has been implemented, without losing service in TDMA regions. Transitions between CDMA and TDMA regions are substantially transparent to users of MS 40, because higher-level GSM network and signaling protocols are observed throughout the system, and only the lower-level RF air interface and associated data link functions are changed during the transition.

Figure 1:
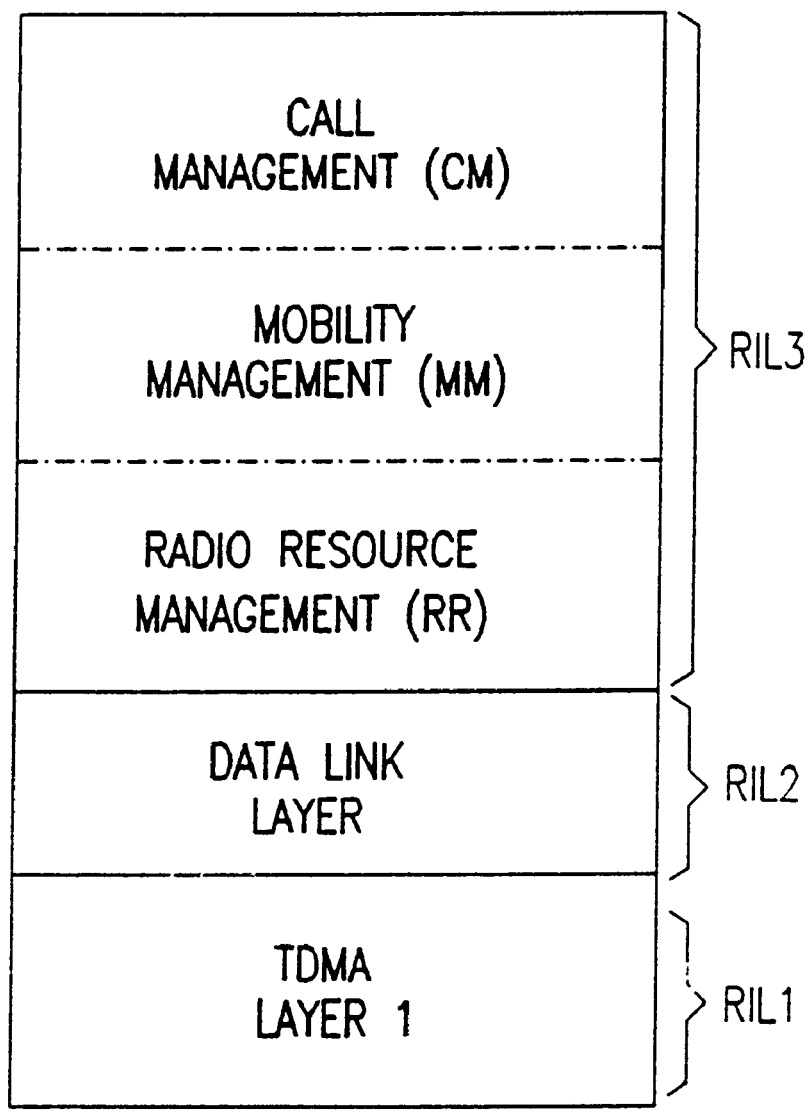
FIG. 1 is a schematic block diagram illustrating a GSM communications protocol stack, as is known in the art.
Figure 3A:
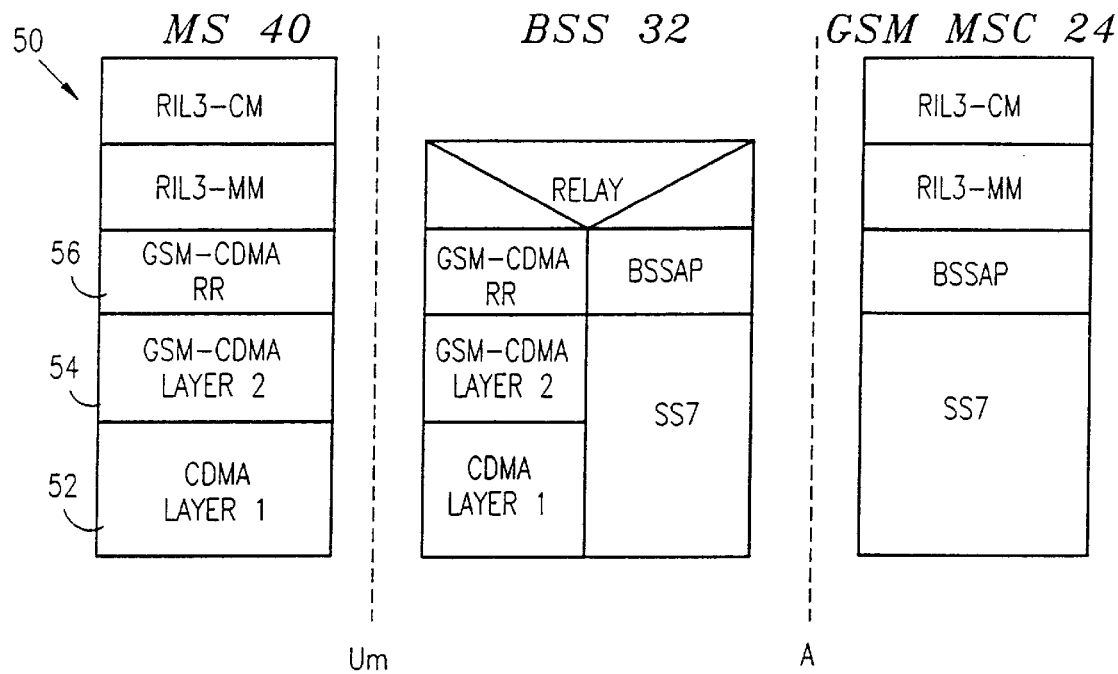
FIG. 3A is a schematic block diagram illustrating communications protocol stacks between elements of the system of FIG. 2, in accordance with a preferred embodiment of the present invention.

FIG. 3A is a block diagram that schematically illustrates protocol stacks used in signaling interfaces between MS 40, CDMA BSS 32 and GSM MSC 24, in accordance with a preferred embodiment of the present invention. These interfaces enable MS 40 to communicate with GSM network 22 over a CDMA air interface. Some aspects of the operation of these interfaces and protocol layers, as well as message flow through these interfaces, is described in greater detail in the above-mentioned U.S. patent application entitled "Base Station Handover in a Hybrid GSM/CDMA Network," and International Patent Application Number PCT/US96/20764. When MS 40 is in communication with MSC 24 via GSM-TDMA BSS 30, the protocol stacks are in accordance with GSM standards, as described hereinabove with reference to FIG. 1, substantially without modification.

MS 40 exchanges signals with CDMA BSS 32 over a CDMA Um interface (or air interface) using a hybrid GSM/CDMA protocol stack 50. The stack is based on a CDMA IS-95 physical layer 52 with the addition of a GSM-CDMA data link layer 54, in which IS-95 operation is modified to accommodate the needs of GSM upper layer protocols, and a GSM-CDMA RR sublayer 56. When MS-40 is in communication with BSS 32, GSM-CDMA RR sublayer 56 invokes the appropriate lower layers 52 and 54 in MS stack 50 to communicate with the GSM-CDMA RR sublayer 56 of BSS 32 over the CDMA Um interface. On the other hand, when MS 40 is in communication with BSS 30, the RR sublayer 56 invokes a substantially standard GSM-TDMA physical layer, data link layer and radio interface layer.

Regardless of which of the air interfaces is in use, GSM-CDMA RR sublayer 56 supports the standard GSM radio interface layer Mobility Management (MM) and Call Management (CM) sublayers above it. The MM and CM sublayers are not processed by BSS 32, but are rather relayed between MS 40 and MSC 24 for processing in a manner substantially transparent to the CDMA interface layers below. The RR sublayer 56 preferably offers complete radio resource management functionality, as defined by GSM specifications 04.07 and 04.08, which are incorporated herein by reference. Although a "RR" layer 56 per se is not defined by the CDMA IS-95 standard, the GSM-CDMA RR sublayer 56 described herein maintains full IS-95 radio resource management functionality, as well.

CDMA BSS 32 communicates with GSM MSC 24 over a standard, substantially unmodified, GSM A-interface, including appropriate SS7 and BSSAP protocols. Because CDMA BSC 34 communicates with GSM MSC 24 using the standard A-interface, substantially no modifications are required in the core GSM MSC in order to enable the addition of CDMA BSS 32 to GSM system 20. Furthermore, MSC 24 need not be aware that there is any difference in identity between GSM/TDMA BSS 30 and CDMA BSS 32, since both communicate with the MSC in a substantially identical manner over the A-interface.

GSM-CDMA data link layer 54 supports both acknowledged and unacknowledged modes of signaling transmission between BSS 32 and MS 40, as provided by both GSM and IS-95 standards. The acknowledged mode is invoked by the RR sublayer 56 by setting a predetermined flag in a message between the BSS 32 and the MS 40, substantially as specified by IS-95B. In addition, layer 54 includes functionality, such as message ordering, priority and fragmentation, and suspension and resumption of communications, which is normally supported by a standard GSM data link layer, but not by a CDMA IS-95 data link layer. Therefore, the GSM-CDMA data link layer 54 is modified relative to a CDMA data link layer (as specified by IS-95) so as to support a number of features of GSM signaling not ordinarily supported by IS-95, including:

Extended radio interface layer message length. According to GSM standard 04.06, section 5.8.5, which is incorporated herein by reference, radio interface layer messages passed to the data link layer for transmission in acknowledged mode may be up to 251 octets long. (As noted hereinabove, radio interface layer messages include, but are not limited to, messages conveyed by or via GSM-CDMA RR sublayer 56.) By comparison, the total length of an IS-95 traffic channel signaling message is 255 octets, but in order to maintain functional integrity and compatibility with IS-95, a number of fields are set aside, including:
Message length (MSG_LENGTH)—1 octet.
CRC—2 octets.
Message type (MSG_TYPE)—1 octet.
Standard data link layer header fields (ACK_SEQ, MSG_SEQ, ACK_REQ)—1 octet.
Encryption information (ENCRYPTION)—2 bits.

Therefore, an IS-95 message can contain no more than 250 octets. Furthermore, if GSM radio interface layer messages are encapsulated as an IS-95 Data Burst Message (DBM) (i.e., are to be transmitted as IS-95 DBMs), or in a form similar to a DBM, as described hereinbelow with reference to FIG. 4, the maximum length of the message data can be no more than 246 octets. Accordingly, the GSM-CDMA data link layer 54 fragments long GSM signaling messages, as described further hereinbelow, to accommodate these length limitations.

Message ordering. According to IS-95 specifications, the IS-95 data link layer protocol for signaling does not guarantee delivery of messages in any particular order. When a sequence of messages must be received in a certain order, a sending entity must await an acknowledgment from a receiving entity of each message in the sequence before sending the next message. The GSM-CDMA data link layer 54, however, provides sequence control, as required by GSM standards, so that specific radio interface layer messages generated by the sending entity (say MS 40) are transmitted and passed to the radio interface layer of the receiving entity (BSS 32) in sequential order.

Message fragmentation. According to IS-95 specifications, a signaling message may be segmented into several traffic channel frames, which are transmitted in sequence. If even one of these frames is lost, however, the entire message must be retransmitted, thus wasting traffic channel bandwidth. The GSM-CDMA data link layer 54 provides orderly fragmentation of long radio interface layer messages, so that only the lost data link layer fragments must be retransmitted. Similarly, if transmission of the data link layer fragments of a long radio interface layer message is preempted, i.e., interrupted, by another, higher-priority message, the GSM-CDMA data link layer 54 preferably resumes transmission afterwards only of the fragments that were not transmitted before the preemption.

Message priority. The GSM-CDMA data link layer 54 supports transmission of radio interface layer messages according to a pre-assigned priority. For example, messages having a GSM service access point identifier (SAPI) of 3, which is assigned to GSM short message service (SMS), have a lower priority than call-related signaling (SAPI 0). Such prioritization is not supported by the standard IS-95 data link layer.

Figure 3B:
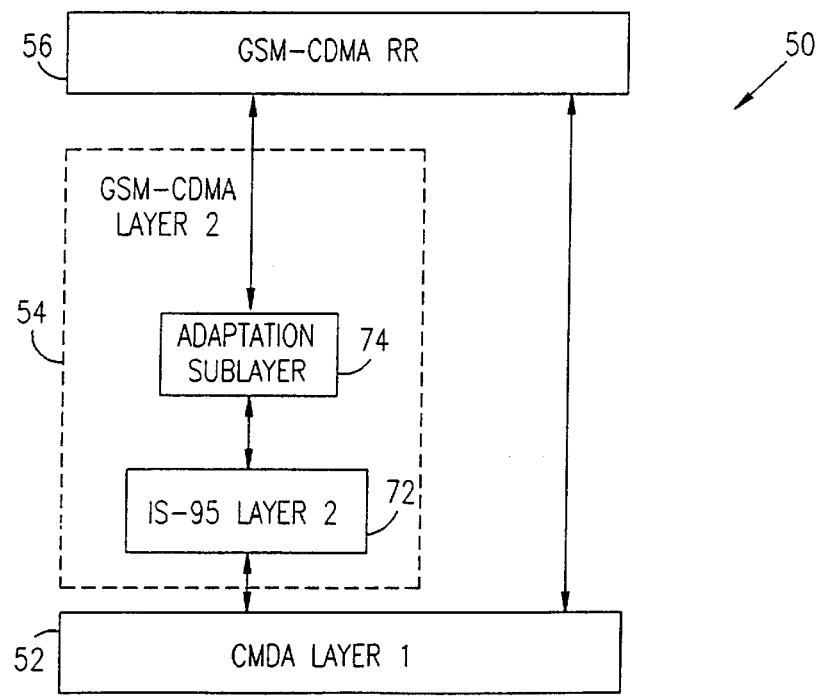
FIG. 3B is a schematic block diagram illustrating details of the protocol stacks of FIG. 3A, in accordance with a preferred embodiment of the present invention.

FIG. 3B is a block diagram illustrating details of the implementation of the GSM-CDMA data link layer 54 in protocol stack 50 of MS 40 and BSS 32, in accordance with a preferred embodiment of the present invention. The GSM-CDMA data link layer 54 comprises an IS-95 data link layer 72, which communicates with IS-95 physical layer 52, and an adaptation sublayer 74, which is added between GSM-CDMA RR sublayer 56 and the IS-95 data link layer 72. The IS-95 physical layer and the IS-95 Radio Interface layer are in accordance with IS-95 standards, substantially without modification. RR sublayer 56 communicates with adaptation sublayer 74 using layer-to-layer messages based on standard GSM service primitives. RR sublayer 56 communicates with the RR sublayer of BSS 32 using a combination of standard GSM signaling messages, standard IS-95 signaling messages, and special GSM-CDMA messages for certain functions. The adaptation sublayer 74 thus provides an interface between the GSM-CDMA RR sublayer 56 and the IS-95 data link layer 72 and enables the GSM signaling features detailed above to be supported.

GSM-CDMA RR sublayer 56 also interfaces with physical layer 52, as defined generally by GSM standards, in order to control functionality of the physical layer operation, such as radio link setup, tear-down and pilot channel measurement, as described in the above-mentioned U.S. patent application entitled "Base Station Handover in a Hybrid GSM/CDMA Network". The present patent application, however, is concerned primarily with service and signaling that are conveyed through the GSM-CDMA data link layer 54.

In order to enable transmission of the GSM-standard and GSM-CDMA messages from RR layer 56 through the IS-95 data link layer 72, adaptation sublayer 74 preferably encapsulates the messages into IS-95 DBMs for transmission by the data link layer. When such DBMs are received, sublayer 74 de-encapsulates the messages and passes the messages up to the RR sublayer. Alternatively, the messages may be encapsulated as a new message type, preferably having the general form and functionality of a DBM, but including elements that are not necessarily recognizable to IS-95 layer 72. For example, the new message type may be created by setting the MSG_TYPE field in the header of a DBM to a value not recognized by the IS-95 standard.

Optionally, certain messages or message types, such as standard IS-95 radio interface layer messages, are not encapsulated, and they are passed through transparently by adaptation sublayer 74. This mode of message transmission is called "tunneling." Preferably, RR sublayer 56 specifies whether or not a particular message is to be encapsulated by adaptation sublayer 74.

FIG. 4 is a block diagram that schematically illustrates the format of an IS-95 DBM 80 that encapsulates all or part of a GSM-CDMA signaling message, in accordance with a preferred embodiment of the present invention. DBM 80 is suitable for transmission over IS-95 traffic channels (also known as dedicated channels), and supports message fragmentation, as described further hereinbelow.

DBM 80 preferably includes the following fields:

MSG_LENGTH 82—In accordance with IS-95 specifications, this field is set to the length, in octets, of the entire message.

DBM header 84—This field is used as defined in the IS-95 specifications for the forward and reverse traffic channels, preferably as specified by IS-95B, sections 7.7.3.3.2.4 and 6.7.2.3.2.4. It preferably includes the following sub-fields:

BURST_TYPE —a differentiation value set to distinguish among different types of DBMs. Existing DBM types and their associated BURST_TYPE values are described in specification TSB-58A, promulgated by the TIA, which is incorporated herein by reference. An unused BURST_TYPE value is assigned to identify DBMs carrying GSM-CDMA signaling messages.

NUM_MSGS—set to the total number of fragments into which the message from radio interface layer is divided (or to 1, if the message is not fragmented).

MSG_NUMBER—set to the number of the present DBM in the sequence of DBMs carrying a single fragmented message (or to 1, if the message is not fragmented).

NUM_FIELDS—set to the number of octets in the total DBM data field, which includes the length of an adaptation header 86 plus the length of a message data field 88, as described hereinbelow.

Adaptation header 86—appended to the message received from GSM-CDMA RR sublayer 56 (or to every fragment of a fragmented message) by adaptation sublayer 74, and includes the following sub-fields:

Extended SAPI (ESAPI) 94—specified by the RR sublayer so as to distinguish between standard GSM signaling messages, for which ESAPI is set to 0, and other messages including special, non-standard messages required for GSM-CDMA signaling, for which ESAPI is set to 1. Special GSM-CDMA messages may be used, for example, in controlling handover between base stations in system 20.

SAPI 96—set in accordance with GSM standards based on the radio interface layer entity supplying the message to be conveyed in data field 88. For CM, MM and RR signaling, the SAPI field is set to 0. For SMS messages it is set to 3, as noted hereinabove. When ESAPI 94 is 1, SAPI 96 is preferably set to 0.

SEQ_NUM 98—a modulo 4 number assigned sequentially to every radio interface layer message transmitted over the traffic channel when operating in acknowledged mode. A separate numbering sequence, beginning from 00, is preferably maintained for every different combination of SAPI and ESAPI values. This field enables the receiving adaptation sublayer to pass the messages in proper order to the receiving RR sublayer and to distinguish between fragments of different messages (since all fragments of a single message have the same SEQ_NUM).

ORD_IND 100—indicates to the receiving adaptation sublayer whether ordering correction is to be applied to received messages in acknowledged mode. Ordering correction is described further hereinbelow.

A reserved bit 102 is ignored, as is another reserved bit 90 following data 88.

Data field 88—contains the information of the message from RR sublayer 56 or other radio interface layer entity, which is encapsulated and conveyed by the GSM-CDMA data link layer 54. Data 88 may include either an entire message or a single fragment of a fragmented message, as indicated in DBM header 84.

CRC field 92—calculated and appended to DBM 80 in accordance with IS-95 specifications.

Figure 5:
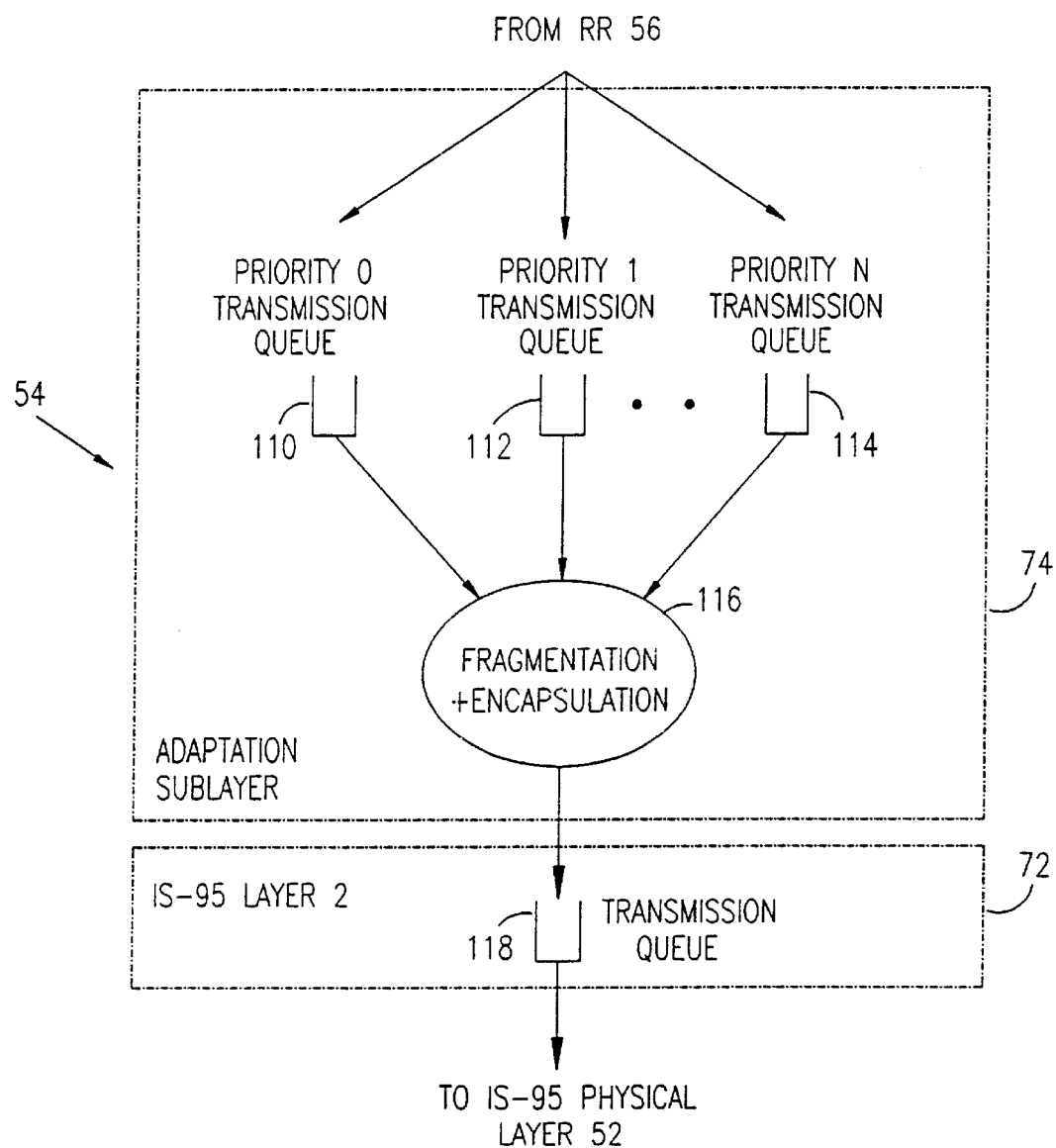
FIGS. 5 and 6 are schematic block diagrams illustrating operation of the protocol stacks shown in FIGS. 3A and 3B, in accordance with a preferred embodiment of the present invention.

FIG. 5 is a block diagram that schematically illustrates processing of messages by GSM-CDMA data link layer 54 for transmission by CDMA physical layer 52, in accordance with a preferred embodiment of the present invention. Adaptation sublayer 54 receives messages from RR sublayer 56 and places them in transmission queues 110, 112, 114 according to a priority level assigned to the messages by the RR sublayer. Three queues are shown, corresponding to high, medium and low priorities, although greater or lesser numbers of queues could also be used. Preferably, messages having ESAPI 1 are assigned high priority, while messages with ESAPI 0/SAPI 0 receive medium priority and those with ESAPI 0/SAPI 3 receive low priority.

A fragmentation and encapsulation block 116 reads the messages, or appropriately-sized fragments of the messages, from the queues in order of their priority. Block 116 processes and conveys the messages, preferably in the form of standard IS-95 DBMs, to a transmission queue 118 in IS-95 data link layer 72, from which they are passed to physical layer 52. Long messages that are to be fragmented by sublayer 74 are so indicated by RR sublayer 56. Preferably, such messages can only be transmitted over a traffic channel in acknowledged mode and must be encapsulated, most preferably in the form illustrated in FIG. 4. The NUM_MSGS and MSG_NUMBER fields of DBM header 84 are set by block 116 according to the number and sequence of fragments, as described hereinabove, wherein a single fragment may sometimes be sufficient for an entire "fragmented" message. Preferably, for efficient transmission, the maximum length of a message fragment is set to 64 octets of radio interface layer data.

Optionally, RR sublayer 56 may specify that encapsulated messages, transmitted over a traffic channel in acknowledged mode operation, should be delivered in order. In this case, block 116 preferably sets ORD_IND 100 to be 1. The order of such messages is maintained based on incrementation of the MSG_SEQ field in DBM header 84 for each new DBM by the IS-95 data link layer. As described further hereinbelow, the ORD_IND and MSG_SEQ fields are used by the adaptation sublayer of the receiving entity to pass the messages to the RR sublayer in their proper order. It is noted that in accordance with normal IS-95 functionality, IS-95 data link layer 72 transmits unacknowledged messages in the order in which they are received from RR layer 56. Preferably, standard IS-95 messages (as opposed to GSM and GSM-CDMA messages) are not specially ordered by data link layer 72.

A further function of the GSM-CDMA data link layer 54 is suspension of acknowledged mode messages from MS 40 to BSS 32 during hard handover to another BSS, such as GSM BSS 30 or another CDMA BSS (not shown in the figures), so as to avoid message loss. Upon initiation of handover, BSS 32 suspends the flow of radio interface layer messages to and from MS 40. Messages waiting in queues 112 and 114 of adaptation sublayer 74 at the MS are held in their queues pending completion of the handover, although high-priority (ESAPI 1) messages relating to the handover are conveyed. After the handover is completed, the queued messages are transferred, if necessary, to an appropriate alternate protocol layer for communication with the new BSS, for example, to a GSM link access protocol on the Dm channel (LAPDm) for transmission to BSS 30. Transmission then resumes. Such message suspension/resumption and transfer functions between different air interfaces are not supported by IS-95.

Figure 6:
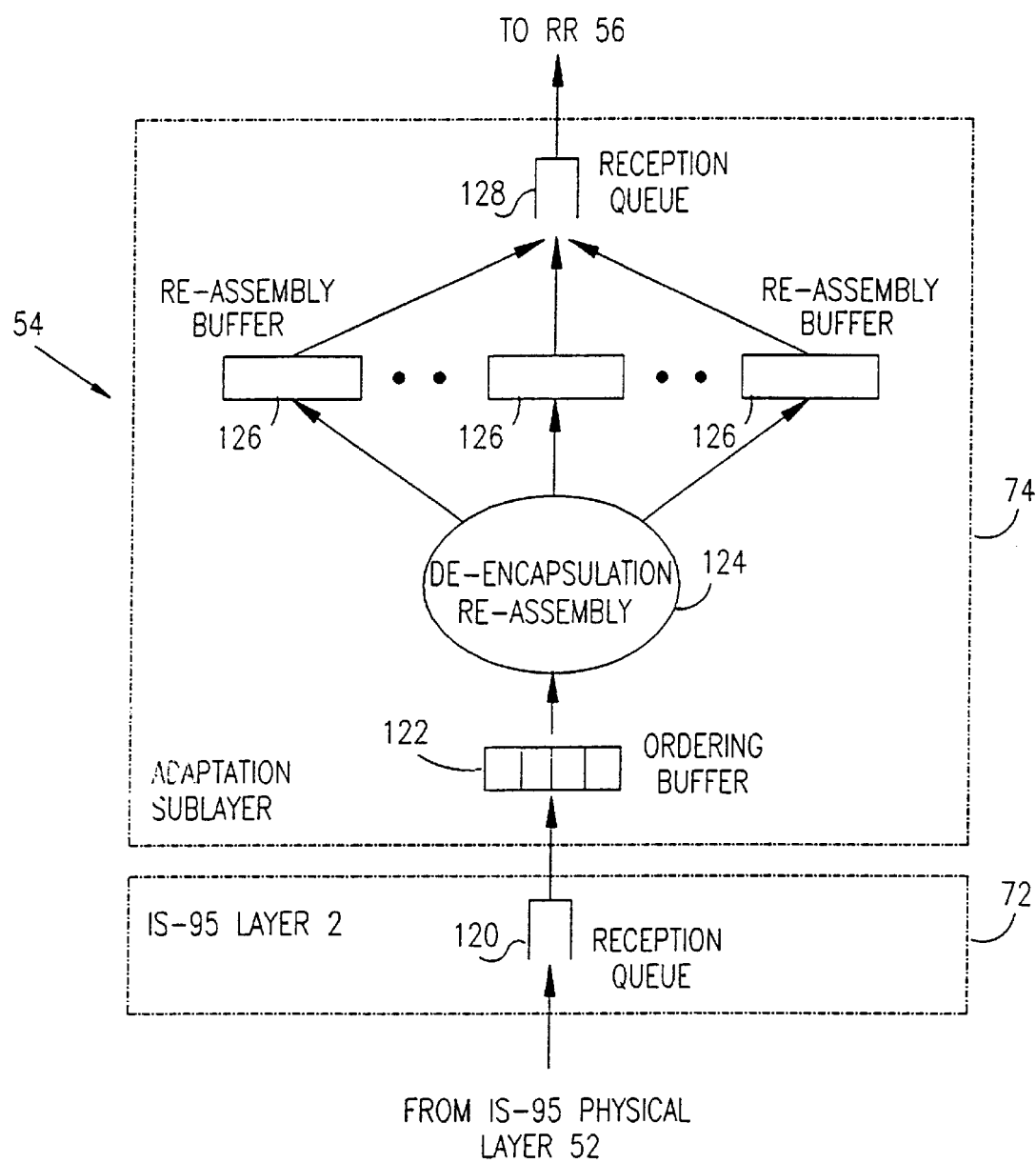

FIG. 6 is a block diagram that schematically illustrates processing of messages received by GSM-CDMA data link layer 54 from IS-95 physical layer 52, in accordance with a preferred embodiment of the present invention. The messages from the physical layer are handled by IS-95 data link layer and are placed in a reception queue 120, from which they are passed to an ordering buffer 122. The buffer preferably includes four entries. When a message in the buffer has the form of DBM 80 (FIG. 4), transmitted in acknowledged mode with ORD_IND 100 set to 1, it is stored in one of the buffer entries according to a modulo 4 value of the MSG_SEQ field in DBM header 84. The messages in buffer 122 are then read out by a de-encapsulation and multiplexing block 124 and processed in order. However, standard IS-95 messages and encapsulated messages that are conveyed over overhead channels or have ORD_IND set to 0 are read out and processed by block 124 as soon as they arrive in the buffer.

Block 124 de-encapsulates the messages and sorts them into concatenation buffers 126 according the ESAPI 94, SAPI 96 and SEQ_NUM 98 fields in their adaptation headers 86. Non-fragmented messages, as indicated by the message type or by a NUM_MSGS value of 1 in DBM header 84, are passed immediately to a reception queue 128, from which they are read out by RR sublayer 56. Fragments of a given fragmented message are held in whichever one of buffers 126 is assigned to that message until all of the fragments have been assembled in order, as indicated by the NUM_MSGS and MSG_NUMBER fields of the fragments. Since each of the "submessages" that carry a fragment of the fragmented message have been assigned a message number in the header according to the sequence of the fragments (e.g., ESAPI 94, SAPI 96 and SEQ_NUM 98 fields in their adaptation headers 86), the received submessages can be concatenated in the sequential order responsive to the message number (e.g., in the order indicated by the ESAPI 94, SAPI 96 and SEQ_NUM 98 fields in their adaptation headers 86). The fully-assembled message is then passed to queue 128.

Although FIGS. 3B, 4, 5 and 6 illustrate a particular preferred embodiment, based on the addition of adaptation sublayer 74 to the protocol stack, it will be appreciated that other modifications to the conventional protocol stack may also be used to provide data link services between GSM-CDMA RR sublayer 56 and CDMA physical layer 52. The embodiment described hereinabove has the advantages of using the standard IS-95 data link layer substantially without modification, due to the introduction of the new adaptation sublayer above it, and of providing substantially full support for standard GSM signaling messages and primitives. As an alternative, for example, a complete, new GSM-CDMA layer could be developed instead of the dual-sublayer structure shown in FIG. 3B, and still provide the required data link layer functionality. Such an alternative would probably be relatively difficult and costly to develop, but might ultimately achieve more efficient operation than the embodiment described above. Other alternative protocol stacks are illustrated in the figures that follow.

Figure 7:
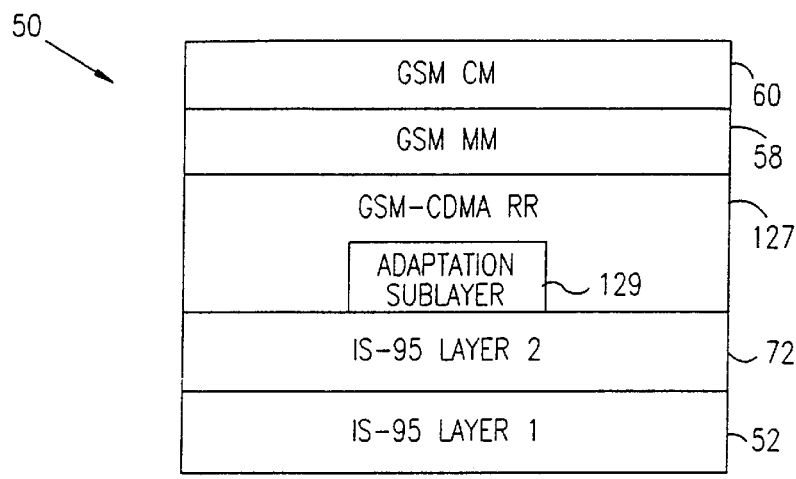
FIGS. 7, 8, 9 and 10 are schematic block diagram illustrating communications protocol stacks for use in the system of FIG. 2, in accordance with alternative embodiments of the present invention.

FIG. 7 is a block diagram that schematically illustrates protocol stack 50, in accordance with an alternative embodiment of the present invention. This embodiment is functionally similar to that shown in FIG. 3B and described in detail hereinabove, except that in the present embodiment, an adaptation sublayer 129 is added as a modification to a GSM-CDMA RR sublayer. Data link layer 72 corresponds to IS-95 data link layer, substantially without modification or addition. The functionality provided by adaptation sublayer 74 within GSM-CDMA data link layer 54 in the embodiment of FIG. 3B is instead carried out here by adaptation sublayer 129.

Figure 8:
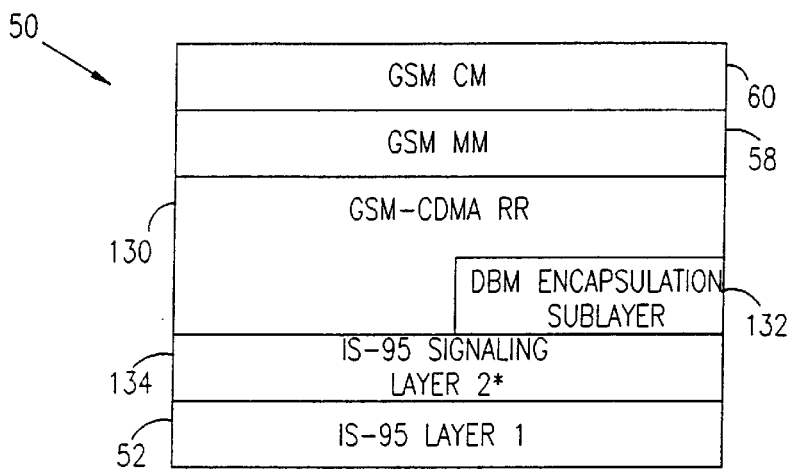

FIG. 8 is a block diagram that schematically illustrates protocol stack 50, in accordance with another alternative embodiment of the present invention, in which a DBM encapsulation sublayer 132 is added as a modification to a GSM-CDMA RR sublayer 130. In addition, stack 50 comprises a IS-95-based data link layer 134 that is modified to transmit and receive DBMs that encapsulate signaling messages longer than the conventional 246 octet limit described above. These modifications allow substantially all GSM-CDMA signaling messages to be encapsulated in the general form of IS-95 DBMs, as described hereinabove, and transmitted in this case without the need for message fragmentation.

In order to accommodate the increased message length, MSG_LEN field 82 of DBM 80 is preferably redefined relative to the IS-95 standard so as to indicate the length of message data 88, less two octets. DBMs modified in this manner will then be able to support radio interface layer messages that are 257 octets long, which is sufficient for 251-octet GSM messages plus 6 octets of DBM header 84. This change applies to encapsulation of messages for transmission over traffic channels in acknowledged mode; no change is needed in the DBM format for overhead channel messages or for unacknowledged transmission. The encapsulation, including application of the DBM header and modified MSG_LEN field, is performed by sublayer 132.

In other respects, implementation of messaging and primitives in the embodiment of FIG. 8 is largely similar to that described above with reference to the embodiment of FIG. 3B. The embodiment of FIG. 8, however, is no longer fully compatible with IS-95 signaling standards, because of the change in the meaning of MSG_LEN.

Figure 9:
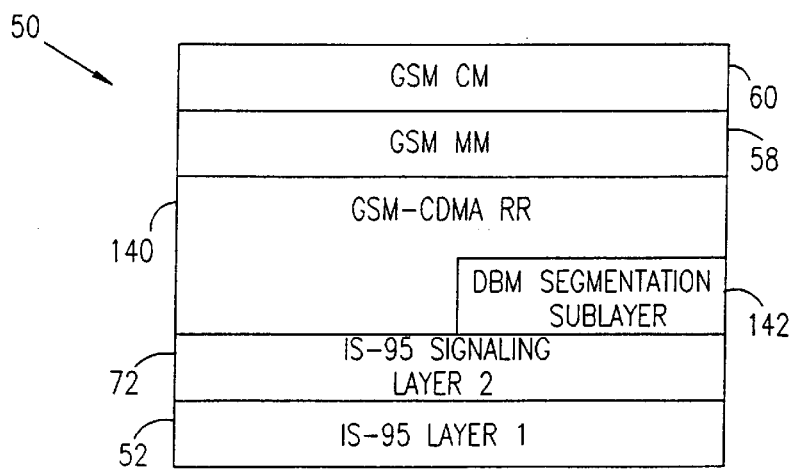

FIG. 9 is a block diagram that schematically illustrates protocol stack 50 in accordance with still another alternative embodiment of the present invention, including a GSM-CDMA RR sublayer 140 that is modified by addition of a DBM segmentation sublayer 142. Data link layer 72 comprises the standard IS-95 data link layer, substantially without modification. Sublayer 142 encapsulates GSM-CDMA messages received from RR layer 140 in IS-95 DBMs, including segmentation of long messages that exceed the maximum length of 246 octets described hereinabove. The encapsulated messages include a proprietary header, generally similar to header 86, mutatis mutandis, which is read and interpreted by the corresponding segmentation sublayer of the receiving entity. From the point of view of layer 72, however, the encapsulated messages are fully compatible with IS-95 standards.

Because of the limitations of the IS-95 acknowledged mode, as described hereinabove, segmentation sublayer 142 must have its own acknowledgment procedure to ensure that when segmented messages are received, they are passed up to GSM-CDMA RR layer 140 complete and in their proper order. Other services provided by adaptation sublayer 74 in the embodiment of FIG. 3B, such as message ordering and prioritization, are similarly performed here by segmentation sublayer 142. The transfer of these data link layer functions up to the level of radio interface layer may add overhead and reduce the efficiency of use of available traffic bandwidth.

Figure 10:
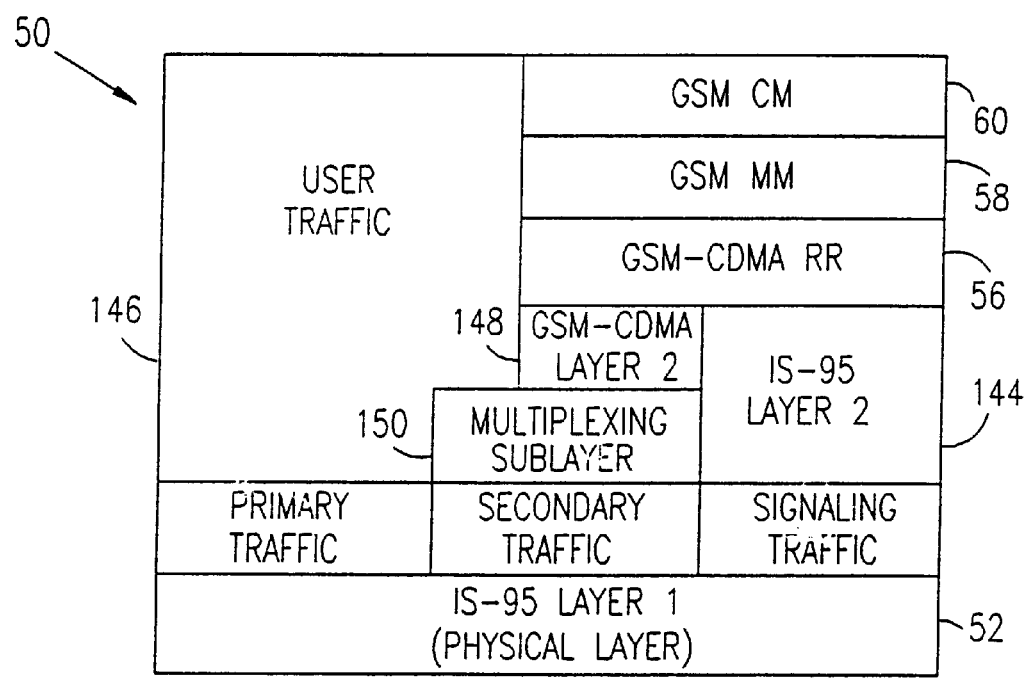

FIG. 10 is a block diagram that schematically illustrates protocol stack 50 in accordance with yet another alternative embodiment of the present invention, in which GSM-CDMA signaling messages are conveyed over a secondary traffic channel of IS-95 physical layer 52. The secondary traffic channel is opened in addition to a primary traffic channel, used for user traffic 146, and a signaling traffic channel, for standard IS95 signaling messages conveyed from an IS-95 data link layer 144. In accordance with IS-95 specifications, secondary traffic channels are opened optionally and ordinarily used for the purpose of conveying supplemental user traffic such as data. In the present case, however, the secondary traffic channel is opened for the dual purposes of conveying the GSM-CDMA signaling messages and for such optional user data.

GSM-CDMA signaling messages from GSM-CDMA RR sublayer 56 are passed by a GSM-CDMA data link layer 148 to a multiplexing layer 150, for transmission over the secondary traffic channel. The multiplexing layer also receives any user data, from user traffic 146, that is destined for transmission over the secondary traffic channel, and multiplexes the signaling and data transmissions over the channel. Thus, substantially all non-standard (GSM-CDMA) messages are carried over the secondary traffic channel, while the signaling traffic channel carries IS-95 signaling messages from layer 144, substantially without modification relative to the IS-95 standard.

Although preferred embodiments are described hereinabove with reference to a particular hybrid GSM/CDMA system, it will be appreciated that the principles of the present invention may similarly be applied to signaling in other hybrid communication systems, as well. Moreover, although the preferred embodiments make reference to specific TDMA- and CDMA-based communications standards, those skilled in the art will appreciate that the methods and principles described hereinabove may also be used in conjunction with other methods of data encoding and signal modulation. The scope of the present invention encompasses not only the complete systems and communications processes described hereinabove, but also various innovative elements of these systems and processes, as well as combinations and sub-combinations thereof.

It will thus be appreciated that the preferred embodiments described above are cited by way of example, and the full scope of the invention is limited only by the claims.

We claim:

1. A method for conveying signaling between a mobile station and a base station via a CDMA air interface, comprising:

generating a signaling message based on a GSM interface standard;

providing data link services to process the signaling message for transmission over the CDMA air interface; and transmitting the processed signaling message over the CDMA air interface, wherein providing the data link services comprises producing an IS-95 message for transmission;

wherein producing the IS-95 message comprises providing a data link protocol layer to process the signaling message based on the GSM interface standard, the data link protocol layer including an adaptation sublayer that receives the signaling message and produces the IS-95 message based on the signaling message;

wherein the adaptation sublayer communicates between the data link protocol layer and a radio resource sublayer;

wherein the data link protocol layer further comprises an IS-95 data link layer, and wherein the adaptation sublayer receives the signaling message from radio resource protocol sublayer based on a GSM standard and conveys the IS-95 message to the IS-95 data link layer.

2. A method according to claim 1, wherein the adaptation sublayer further receives a signaling message based on an IS-95 standard and conveys the signaling message based on the IS-95 standard substantially without processing.

3. A method for conveying signaling between a mobile station and a base station via a CDMA air interface, comprising:

generating a signaling message based on a GSM interface standard;

providing data link services to process the signaling message for transmission over the CDMA air interface; and transmitting the processed signaling message over the CDMA air interface wherein providing the data link services comprises suspending transmission of the GSM signaling message by the mobile station during a hard handover of the mobile station from a first base station to a second base station and resuming the transmission after the handover is complete; and wherein the first base station has a CDMA air interface, and the second base station has a GSM-TDMA air interface, and wherein providing the data link services comprises transferring the message whose transmission is suspended responsive to the hard handover to a GSM data link protocol layer, so that the message is prepared for transmission over the GSM-TDMA air interface.

4. Wireless communications apparatus for use in a GSM mobile telecommunications system, comprising:

a base station; and a mobile station having a transceiver for communicating over a CDMA air interface with the base station and to providing data link services for processing messages to be transmitted over the CDMA air interface, such that signaling messages between the base station and the mobile station, which are generated in accordance with a GSM interface standard, are processed for transmission over the CDMA air interface, wherein the CDMA air interface is based on an IS-95 standard;

wherein the base station and mobile station communicate using a protocol stack including a data link protocol layer to process the signaling messages based on the GSM interface standard, the data link protocol layer including an adaptation sublayer that receives the signaling messages and produces an IS-95 messages based on the signaling messages;

wherein the adaptation sublayer communicates between the data link protocol layer and a radio resource sublayer; and wherein the data link protocol layer further comprises an IS-95 data link layer, and wherein the adaptation sublayer receives the signaling messages from a radio resource protocol sublayer based on a GSM standard and conveys the IS-95 message to the IS-95 data link layer.

5. Apparatus according to claim 4, wherein the adaptation sublayer further receives a signaling message based on an IS-95 standard and conveys the signaling message based on the IS-95 standard substantially without processing.

6. Wireless communications apparatus, for use in a GSM mobile telecommunications system, comprising:

a base station; and a mobile station communicative with the base station, and configured to communicate over a CDMA air interface with the base station and to provide data link services for processing messages to be transmitted over the CDMA air interface, such that signaling messages between the base station and the mobile station, which are generated in accordance with a GSM interface standard, are processed for transmission over the CDMA air interface, wherein the mobile station suspends transmission of the messages during hard handover of the mobile station from a first base station to a second base station and resumes transmission after the handover is complete, wherein the first base station has a CDMA air interface, and the second base station has a GSM-TDMA air interface, and wherein the suspended messages are transferred responsive to the handover to a GSM data link layer, so that the messages is prepared for transmission over the GSM-TDMA air interface.

7. A Wireless mobile station, for use in a GSM mobile telecommunications system, comprising:

a CDMA air interface transceiver to be used to transmit and receive communication signals;

a data link layer modified so as to support a GSM-CDMA radio interface layer that is based on a GSM radio interface layer;

a GSM-RR sublayer modified so as to interact with a CDMA air interface;

a mobility management sublayer which is substantially in compliance with GSM standards; and a call management sublayer substantially in compliance with GSM standards, wherein the CDMA air interface transceiver, the modified data link layer, the modified GSM-RR sublayer, and the mobility management sublayer cooperate in such a way that signaling messages between the base station and the mobile station, which are generated in accordance with a GSM interface standard, are processed for transmission over the CDMA air interface.

8. The wireless mobile station of claim 7, wherein the modified data link layer includes:

a lower sublayer, substantially corresponding to IS-95 data link layer, which communicates with the CDMA physical layer; and an upper sublayer, communicating between the lower sublayer and the GSM-RR sublayer.

9. The wireless mobile station of claim 8, wherein the upper sublayer encapsulates the signaling message in the general form of an IS-95 Data Burst Message.

10. The wireless mobile station of claim 7, wherein a message number is assigned in a header of each of a plurality of sub-messages according to the order in which the sub-messages occurs in a message comprising each of the sub-messages, such that when the sub-messages are received, they may be concatenated in order, as indicated by the message number.

* * * * *